United States Patent [19]

Jarboe et al.

[11] 4,017,578
[45] Apr. 12, 1977

[54] METHOD FOR PRODUCING LASER TARGETS

[75] Inventors: Thomas R. Jarboe, Oakland; William R. Baker, Orinda, both of Calif.

[73] Assignee: The United States of America as represented by the United States Energy Research and Development Administration, Washington, D.C.

[22] Filed: June 12, 1975

[21] Appl. No.: 586,459

Related U.S. Application Data

[62] Division of Ser. No. 446,066, Feb. 26, 1974, Pat. No. 3,907,477.

[52] U.S. Cl. .................................. 264/143; 176/1; 264/102
[51] Int. Cl.² ..................... B02C 18/02; G21B 1/02
[58] Field of Search ............... 176/1; 264/140, 141, 264/145, 148, 143, 102

[56] References Cited

UNITED STATES PATENTS

| | | | |
|---|---|---|---|
| 2,685,528 | 8/1954 | Robinson | 264/148 |
| 3,723,246 | 3/1973 | Lubin | 176/1 |
| 3,723,703 | 3/1973 | Ehlers et al. | 176/1 |

*Primary Examiner*—Robert F. White
*Assistant Examiner*—John Parrish
*Attorney, Agent, or Firm*—Dean E. Carlson; Roger S. Gaither; L. E. Carnahan

[57] ABSTRACT

An apparatus and method for producing deuterium targets or pellets of 25μ to 75μ diameter. The pellets are sliced from a continuously spun solid deuterium thread at a rate of up to 10 pellets/second. The pellets after being sliced from the continuous thread of deuterium are collimated and directed to a point of use, such as a laser activated combustion or explosion chamber wherein the pellets are imploded by laser energy or laser produced target plasmas for neutral beam injection.

1 Claim, 7 Drawing Figures

METHOD FOR PRODUCING LASER TARGETS

BACKGROUND OF THE DISCLOSURE

The invention described herein was made in the course of, or under Contract No. W-7405-ENG-48 with the United States Atomic Energy Commission.

This is a division, of application Ser. No. 446,066, filed Feb. 26, 1974 U.S. Pat. No. 3,907,477.

This invention is directed to controlled thermonuclear energy devices, and more particularly to an apparatus and method for producing small deuterium pellets or targets for use in laser activated CTR systems, wherein the targets are dropped through the focal point of a high power laser for forming an energetic plasma by radiation thereof. Laser systems utilizing pellets or targets of hydrogen and hydrogen isotopes such as deuterium are known in the art, as exemplified by U.S. Pat. No. 3,723,703 issued Mar. 27, 1973, and assigned to the assignee of this application.

In the development of laser-fusion controlled thermonuclear reactors for the production of electric power, for example, there is considerable interest in studying plasmas produced by laser irradiation of solid fuel pellets or targets. While plasmas formed from solid LiH pellets have been studied as set forth in an article by A. F. Haught et al, Phys. Fluids 13, 2825 (1970), there are advantages in using fuel pellets of pure hydrogen, or its isotopes (deuterium or deuteriumtritium mixture), since hydrogen isotopes take the least amount of energy to ionize fully, and they lose less energy through bremsstahlung and line radiation than any other element. Therefore, hydrogen or hydrogen isotope plasmas can be kept hot more easily than other types of pellets, and an analysis of the plasma thus generated is simplest when only one type of ion is present.

Deuterium pellets of 100 to 400$\mu$ size have been previously produced and irradiated, as discussed, for example, in an article by G. Francis et al, Phys. Letters A25, 486 (1967). However, in order to get a fully ionized plasma of > 100 eV ions using a 10 joule laser, it is desirable to use smaller pellets. Small spherical pellets produced by freezing liquid droplets have also been irradiated. However, the disadvantage of this prior method is that the droplets must be produced at pressures higher than the triple point pressure of deuterium (131 Torr). Other prior methods for producing these small pellets or targets have involved the use of liquid helium which reduces the safety factor and increases the fabrication expense.

SUMMARY OF THE INVENTION

The present invention provides an apparatus and method for producing deuterium pellets or targets having a diameter in the range of about 25$\mu$ to 75$\mu$ but preferably of about 50$\mu$, while using no liquid helium and only a small amount of liquid hydrogen, which renders the fabrication process both safe and inexpensive (approximately $10^{-5}$ dollar per pellet).

In the apparatus of this invention, the pellets are produced by slicing a 50$\mu$ diameter deuterium thread into 50$\mu$ length cylinders with a thin tungsten wire. The solid thread is made by allowing liquid deuterium of the proper temperature and pressure to flow through an aperture into a vacuum. The temperature is controlled through the vapor pressure of continuously produced liquid hydrogen coolant. After being produced, the pellets are collected by a funnel and collimated by falling through a quartz capillary tube.

Therefore, it is an object of this invention to provide an apparatus and method for producing laser targets of a diameter in the range of about 25$\mu$ to 75$\mu$.

A further object of the invention is to provide an apparatus for producing deuterium pellets of a 50$\mu$ diameter and at a rate of 0 – 10 pellets/second.

Another object of the invention is to provide an apparatus for making small deuterium pellets wherein no liquid helium is utilized.

Another object of the invention is to provide an apparatus for making 50$\mu$ deuterium pellets wherein a solid thread is continuously formed and the pellets produced by slicing the thread into 50$\mu$ lengths, whereafter the pellets are collected by a funnel mechanism and collimated.

Other objects of the invention will become readily apparent to those skilled in this art from the following description and accompanying drawings:

DESCRIPTION OF THE INVENTION

This invention is directed to an apparatus and method for producing laser targets or pellets of deuterium having, for example, a 50$\mu$ diameter, although a diameter range of 25$\mu$ to 75$\mu$ can be produced. In the apparatus the pellets are produced by slicing a 50$\mu$ diameter thread into 50$\mu$ length cylinders with a thin tungsten wire vibrated by a coil drive at a desired frequency. The solid thread is made by allowing liquid deuterium of the proper temperature and pressure to flow through an aperture into a vacuum. The temperature is controlled through the vapor pressure of continuously produced liquid hydrogen coolant. After being sliced from the thread, the pellets are collected by a funnel and collimated by falling through a quartz capillary tube having spaced vacuum ports therein, and are dropped through the focal point of a laser which irradiates same. This method of pellet production uses no liquid helium and only a small amount of liquid hydrogen, which renders the process both safe and inexpensive (approximately $10^{-5}$ dollar per pellet).

Figure 1:
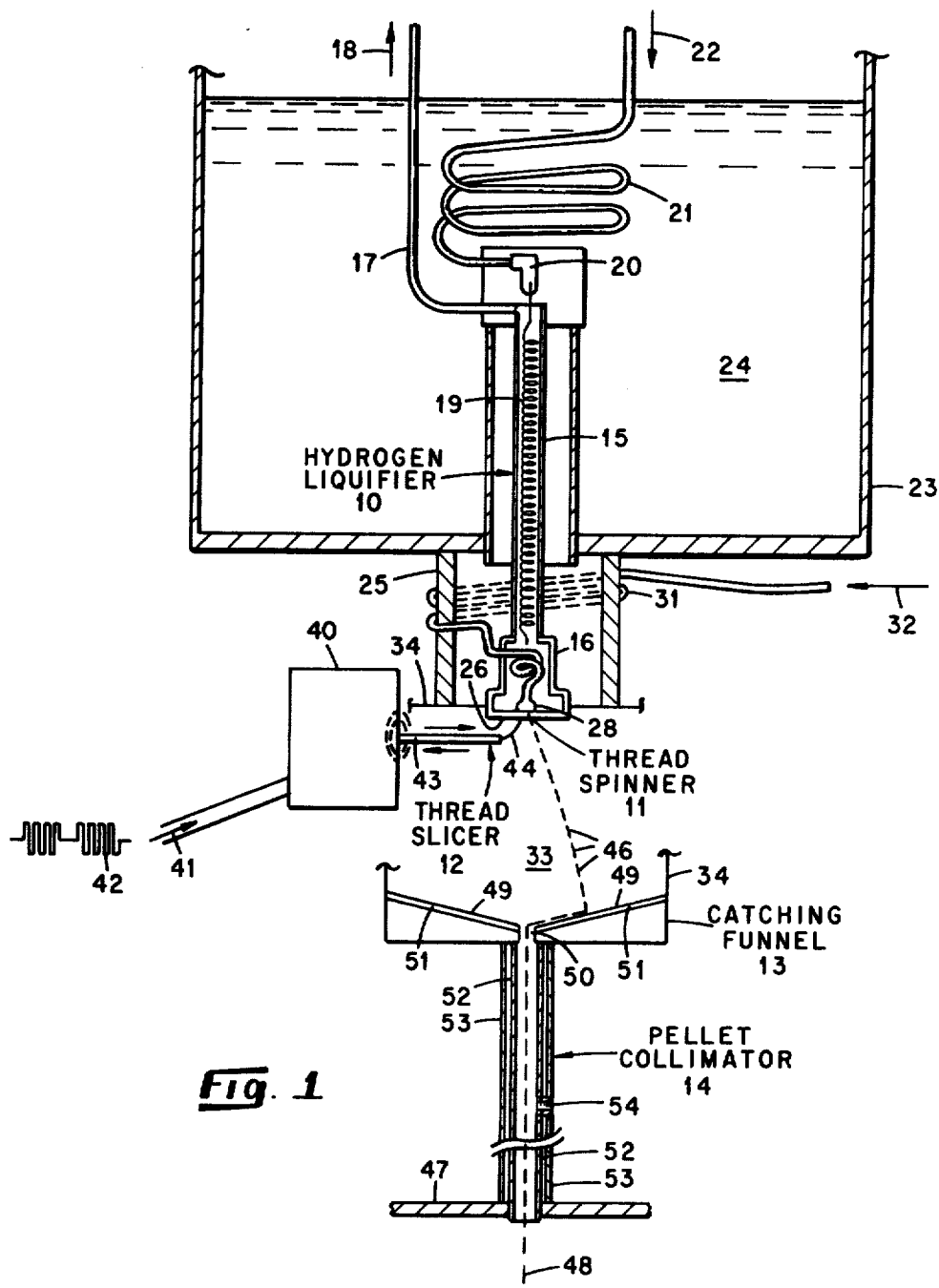
FIG. 1 is a partially schematic view of the apparatus of the invention.

The apparatus for producing 50$\mu$ deuterium pellets consists of five general component sections illustrated in FIG. 1: a hydrogen liquefier 10, a thread spinner 11, a thread slicer 12, catching funnel 13, and pellet collimator 14. Each of these general component sections will be hereinafter described as separate subsections for purposes of clarity.

Hydrogen liquefier 10 comprises a counter-current heat exchanging capillary assembly composed of a tube 15 which is connected at the lower end to a hollow bell-shaped member 16 and connected at the upper end to a hydrogen ($H_2$) exhaust conduit of tube 17, which discharges into a collection point indicated by arrow 18, a coiled capillary wire or tube 19 extends through a substantial portion of tube 15 and is suspended therein from a coupling or head 20 which in turn is connected via a coiled conduit or tube 21 to a source of high pressure $H_2$, for example, pressure ≈70 atmospheres, as indicated by arrow 22. A closed container or vessel 23 containing liquid nitrogen indicated at 24 and at a pressure of about 250 Torr is positioned around the upper portion of hydrogen liquefier 10 while a hollow member 25, which may contain liquid nitrogen, is positioned around the lower portion thereof and secured to the lower end of vessel 23. By way of example, the components of liquefier 10 can be constructed from materials as follows: tube 15 of 0.125 inch OD 0.010 thick wall, 304 stainless steel, tube 19 of 0.020 inch OD × 0.006 inch ID ×16 inch copper (Cu), member 16 of 304 stainless steel, vessel 23 of 304 stainless steel (SS) and copper (Cu) bottom, and member 25 of copper (Cu). In operation, high-pressure hydrogen gas is used to produce liquid hydrogen coolant. Hydrogen gas from a source, such as a high pressure bottle, at a pressure of about 70 atmospheres is directed as indicated by arrow 22 through coiled tube 21 wherein it is cooled to about 65° K by the liquid nitrogen 24 in vessel 23, and then allowed to expand out through counter-current heat exchanged capillary hydrogen liquefier 10 which has no constriction at the output. Although such a constriction is generally used because it increases the effectiveness of the counter-current heat exchanging, it also increases the chance of the capillary tube becoming plugged from the impurities in the $H_2$ that condense out. In this apparatus, plugging is virtually eliminated by using the straight-walled capillary assembly and by filtering the incoming $H_2$. The capillary tube 19 is, for example, 150μ internal diameter (ID) and is approximately 40 cm long. Approximately 0.15 liter/sec. STP (standard temperature-pressure) of $H_2$ is used in the liquefier 10.

The present apparatus uses two separate thermally connected cavities: one containing the coolant (member 16), the other the thread material (thread spinner 11). Thus the pressure, temperature, and thread material of the extrusion cavity can be independently varied. The temperature can be regulated to within 0.1° K by adjusting the pressure in the liquefying cavity (member 16) to the nearest 20 Torr. Note that the only equipment needed for temperature regulation is a needle valve and pressure gauge (not shown) in the $H_2$ exhaust tube 17, the exhaust pressure being at about 1 atmosphere.

Thread spinner 11 includes bell-shaped member 16 which includes a bottom or closure plate 26 of refined copper having a thickness of 300μ, for example. Plate 26 is provided with a tapered extrusion aperture orifice 27 (see FIG. 2) defining a 100μ opening of the orifice inner face and a 70μ opening on the orifice outer face. A block 28 of high purity copper, or other material that is a good heat conductor at low temperatures, defining a cavity or chamber 29 is positioned about orifice 27 on the inner side of plate 26 and secured thereto, or made integral therewith forming a reservoir or well containing deuterium indicated at 30. A tube or conduit 31 is connected at one end to block 28, extends through bell-shaped member 16 and outwardly through and wrapped about member 25 and connected at the outer end to a source of deuterium indicated by arrow 32 at a pressure of about 500 Torr, for example. The deuterium 30 is precooled to liquid nitrogen temperature (65° K) as it passes through tube 31 into cavity chamber 29 for passage through orifice 27 into a vacuum chamber indicated at 33 maintained within a housing 34, only partially shown for clarity.

It has been found experimentally that a stable deuterium thread is produced when the temperature of the copper plate 26 and deuterium cavity 29 is between 19° and 22° K and the cavity pressure is between 400 and 1200 Torr. The rate at which the thread is formed is about 4mm/sec. Changing the temperature or pressure seems to have little effect on the rate of the thread formation or its diameter except near the extremes of the operating range. During normal operation the pressure is set at 500 Torr and the temperature at 21° K. To increase or decrease the size of the deuterium thread, the size of orifice 27 would be adjusted accordingly.

Figure 4:
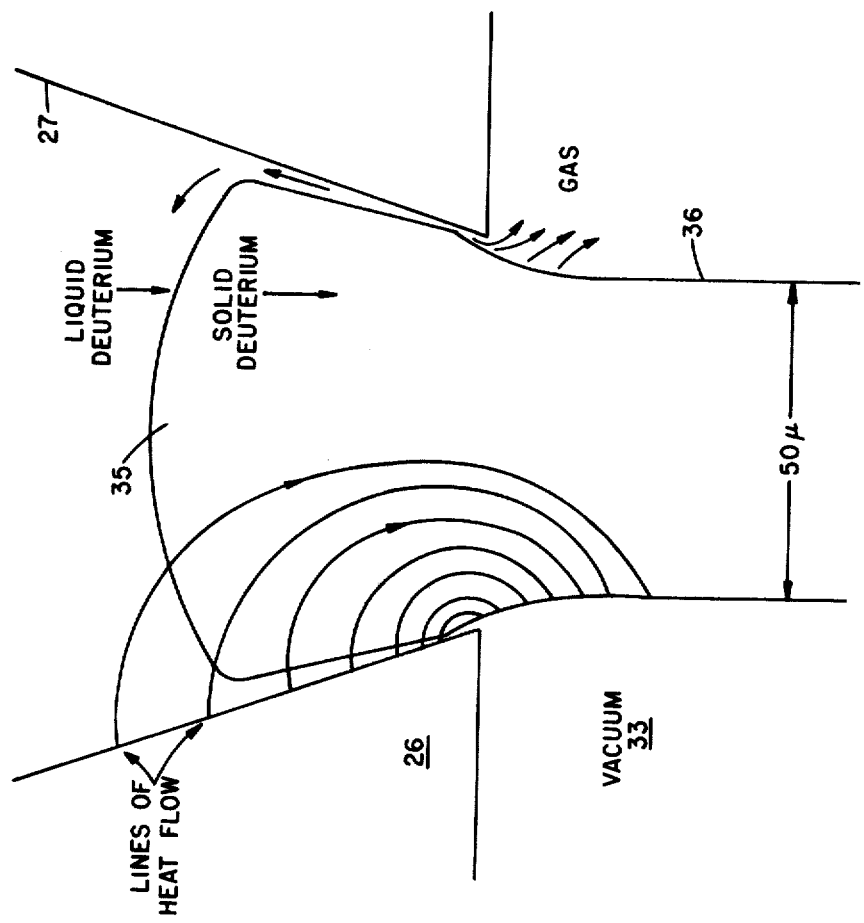
FIG. 4 illustrates a qualitative explanation of the thread spinning operation.

FIG. 4 shows a qualitative explanation of the thread spinning carried out by the above-described apparatus. As indicated by legend, lines of heat flow are shown on the left and the directions of solid, liquid, and gas movements are shown on the right. When liquid deuterium is introduced through tube 31 into cavity 29, a plug of solid deuterium indicated at 35, forms at the extrusion orifice or aperture 27 from the liquid that is cooled and frozen through evaporation when it is exposed to the vacuum 33. Liquid deuterium flows into the plug from above and solid and gaseous deuterium flow out the bottom of orifice 27. As the tapered plug of solid deuterium moves downward, the deuterium melts near the copper plate 26 and is removed by pressure in the liquid layer next to the copper. Steady flow occurs when the downward force from the pressure above plug 35 is balanced by the upward force on the plug from the pressure in the liquid layer, adjacent the periphery of orifice 27, whereby a continuous solid thread of deuterium, indicated at 36 and having a diameter of 50μ, for example, is extruded through orifice 27. This balance can be achieved by keeping the temperature of copper plate 26 near triple point temperature of deuterium (18.69° K) which maintains the desirable controlled distance between the solid deuterium and the copper.

The total amount of deuterium that flows into the vacuum chamber due to the thread and its production is ≈50 micron-liters per second. This low pumping load is important since it allows one to easily maintain a pressure less than $10^{-4}$ Torr, which is necessary because forces develop on the thread 36 or pellets formed therefrom due to gas moving between surfaces of different temperatures. These forces arise because more momentum flux is incident on the thread from the hot surface (lower or outer surface of plate 26) than from the cold surface (upper or inner surface of plate 26) and because the thread ablates at a greater rate on the side facing the hot surface. Both of these phenomena force the pellets toward the cold surfaces. It is conceivable that these forces could be used to collimate and/or transport the pellets, or they can be reduced by decreasing the pressure of the vacuum chamber 33. These forces were observed to dominate the motion of the pellets during early experiments but were made small compared to gravitational forces, but decreasing the pressure in the vacuum chamber. Such forces will be small, compared to gravitational forces, if $p << \rho g l$, where $p$ is the chamber pressure, $\rho$ = the pellet density, $g$ = gravitational acceleration, and $l$ = the characteristic size of the pellet. For a 50μ deuterium pellet, $\rho g l = 7\times 10^{-4}$ Torr.

Figure 5:
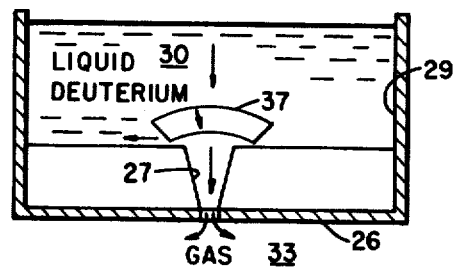
FIGS. 5–7 illustrate improper thread formation modes of operation.
Figure 6:
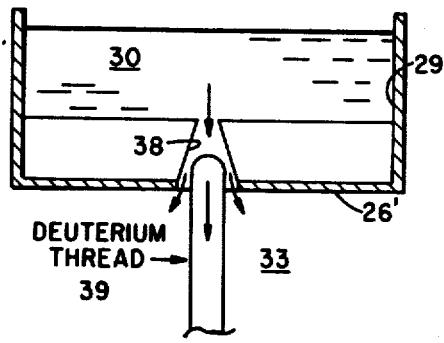
Figure 7:
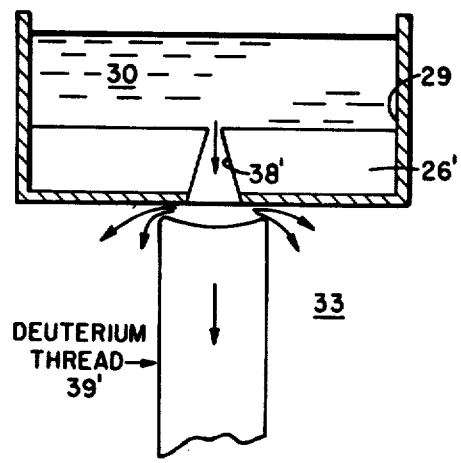

FIGS. 5–7 illustrate improper modes of operation that were observed during experimental testing. In the so-called "freeze-off" mode (FIG. 5) a dome 37 of solid deuterium forms over the tapered orifice or aperture 27 only gas enters the vacuum chamber 33 as indicated by legends. This mode of operation puts out about 2000 micron-liters of gas per second. By raising the temperature to the normal operating range (19° K – 22° K), the stable thread used to make pellets forms.

If the extrusion orifice or aperture is inverted, as shown in FIG. 6 at 38 a thread 39 will form, but it will move very fast. Liquid surface tension holds the thread to the copper plate 26'. Attempts to slice the thread 39 into pellets break this weak (liquid surface tension) bond and disrupt the formation of the thread. Increase of pressure on the mode illustrated in FIG. 6 results in an unstable thread 39' which is larger than the extrusion orifice 38' as shown in FIG. 7.

The amount of deuterium flowing into vacuum chamber 33 while operating in any of the modes illustrated in FIGS. 5–7 is more than an order of magnitude larger than the amount of deuterium introduced while making pellets by the mode illustrated in FIG. 4. Finally, there is another mode of operation, not illustrated, which is caused by too high a temperature and/or pressure wherein a large amount of liquid deuterium flows through the extrusion orifice, forming random-sized globs of frozen deuterium. This latter mode of operation is called "blow-out" and generally overloads the vacuum system.

Figure 2:
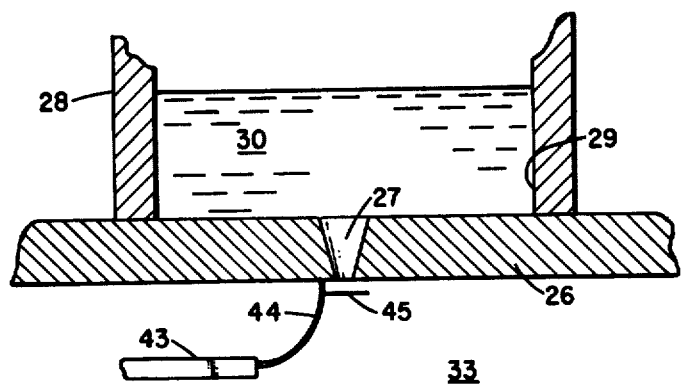
FIG. 2 is an enlarged partial cross-sectional view of the thread forming nozzle and slicing mechanism of the FIG. 1 apparatus.
Figure 3:
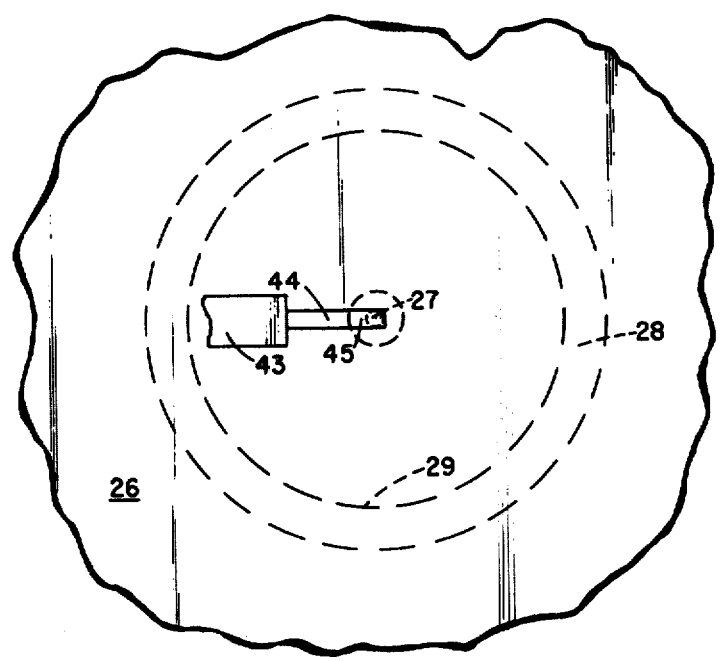
FIG. 3 is a partial bottom view of the FIG. 2 mechanism.

Thread slicer 13, illustrated in FIGS. 1–3 comprises a driver indicated generally at 40, such as loud-speaker coil, into which is directed, as indicated by arrow 41 a gated square wave driving signal 42, and the output of which moves a rod or member 43 in a reciprocating motion as indicated by the arrows, rod 43 having secured at the outer end thereof a wire or rod 44 on which is mounted a slicer wire 45 of tungsten, for example, as shown in greater detail in FIGS. 2 and 3. The outer end of wire or rod 44 is in light contact with the bottom of plate 26, with slicer wire being located about 25μ from the plate 26. As a stable thread 36 is produced as described above with respect to FIG. 4, it is sliced into pellets indicated at 46 (see FIG. 1) by slicer wire 45 (which for example may have a cross-section or diameter of 25μ) which is driven past orifice 27 perpendicular to the thread 36 and cuts it into desired lengths, 50μ for example. Slicer wire 45 is reciprocally driven by speaker coil or driver 40 which is driven with, for example, a 250-Hz, gated square wave signal 42. While the 250-Hz oscillation is on, the thread 36 is vaporized at the plane of oscillation of the relatively hot wire 45. Pellets 46 of desired length are extruded through orifice 27 while the wire 45 is stopped. Thus, by adjusting the on and off time of the 250-Hz oscillation by timing mechanism within driver 40, but not shown in detail, one can control the length of pellet 46 and the rate of pellet production.

It was found experimentally that when a 25μ wire (slicer wire 45) was passed through the deuterium thread 36 only once, the thread remained intact. It can be speculated that the wire, which is held at liquid deuterium temperature (21° K by means of liquid hydrogen coolant) passes through the thread causing it to liquefy near the wire. This liquid flows around the wire and fuses the thread together again on the other side, much of the deuterium in the thread being evaporated at each pass. Several pass (5 for example) are needed to slice the thread which indicated the smoothness of the slicing method.

The slicing action is so gentle that it can be adjusted so as not to traverse the thread completely. This causes the thread to be notched in such a way that the pellets produced are connected by a small filament of deuterium. By observing the notched thread with a microscope while operating in this manner, the length of these connected pellets can be made approximately equal to the diameter of the thread. Then the amplitude of the oscillation of the wire can be increased until the thread is completely severed, thus producing cylinders of, for example, 50μ length and diameter. Preliminary measurement of the amount of deuterium in the pellets indicates that the length of the pellet can be adjusted to give about $3\times 10^{15}$ molecules per pellet.

Catching funnel 13 and pellet collimator 14 function for collecting pellets 46 and directing same into a point of use such as a combustion chamber indicated at 47 at the correct position along path 48 to be vaporized by pre-positioned lasers, not shown, which, for example, may be part of a system such as taught in the above-referenced U.S. Pat. No. 3,723,703. As shown in FIG. 1 pellet 46 fall onto a sloping member 49 of catching funnel 13 and roll to the center thereof where they pass through an opening or aperture 50 in member 49 and fall through pellet collimator 14 along path 48. The surface of sloping member 49 is roughened to minimize any tendency for the pellet to spiral around the funnel. The pellet thus takes the shortest path to the center of the sloping member and surface contact is minimized. The structure of the catching funnel 13 is quite hot (about 77° K) compared with the below 20° K temperature of the pellets, the sloping member 49 is cooled to liquid nitrogen (77° K) by a cooling jacket 51 located beneath member 49 and connected to a liquid nitrogen source by means not shown.

As shown in FIG. 1, pellets leave the slicing region with some horizontal velocity and are caught by sloping member 49, which, for example, may be an 8 cm. diameter copper funnel-like member with central aperture or opening 50 having a 2 mm. diameter. The relatively flat sloping member 49 has a slope of about 20° because less horizontal and vertical velocity is given to the pellets in bringing them to the center for passage through opening 50. This slope is just steep enough to prevent the pellets from sticking to impurities and imperfections in the funnel surface, while the roughened surface of member 49 reduces surface contact to avoid premature vaporization of the pellet due to the temperature difference between the pellet and structure of catching funnel 13. A low verticle velocity is desirable because the pellets will then have a longer time in the pellet collimator 14 to lose its horizontal velocity.

After leaving the catching funnel 13 the pellets 46 fall through pellet collimator 14 composed of a capillary tube 52 having a colling jacket 53 thereabout. For example, capillary tube 52 may be a 3 mm inside diameter quartz tube cooled to liquid nitrogen temperature, quartz being preferred because it is essential that the interior wall of the tube be clean and smooth. Cooling jacket 53 is connected, though not so shown, to a source of liquid nitrogen. The pressure within tube 52 must decrease from funnel catcher 13 to combustion chamber 47 since the combustion chamber must be maintained at a very high vacuum, this being accomplished by a series of vacuum pumpout ports 54 (only one shown) along the length of tube 52. Since there is some vaporization of each pellet 46 in the tube 52, it is essential that the vapor pressure within the tube be kept sufficiently low so that the pellets are not unduly warmed by conductance through the gas to the tube. A maximum pressure exists for a given diameter of the tube that results in a sharply increased rate of vaporization. The vacuum ports 54 are distributed downwardly along the tube at increasing distances since the pellet falls at an increasing speed due to gravity. As an alternate for the vacuum ports 54 the tube 52 may be broken, for example, into 10, 15 and 20 cm segments, providing openings similar to ports 54 between the separated segments, to allow for the escape of gas from the pellets. The length and diameter of the segments allows sufficient gas conductivity to prevent gas buildup in the tube.

The following conditions must be satisfied so that pressure does not buildup the tube 52: $C >> NRA\nu_s$, where C is the conductivity of the tube, N is the maximum number of pellets in the tube, R is the number of molecules liberated by the collision of a gas molecule with pellets, A is the total area of the pellet, and $\nu_s$ is the thermal velocity of gas in the tube. If this inequality is not satisfied, gas will evaporate from the pellet in the tube at a greater rate than can be exhausted by the tube. Thus, there will be an exponential increase of the gas pressure in the tube that will blow pellets out of either end of the tube, usually with considerable horizontal velocity, and the pellets will not be collimated.

This inequality is satisfied for the capillary tubes used to collimate the pellets 46. The pellets seem to fall parallel to the tube along path 48 and are distributed over the cross-sectional area of the tube. If the pellets are produced, for example, at the rate of ten per second (10/sec.), then the incident rate of pellets in the focal region of a laser located within combustion chamber 47 is ≈1/min. The last segment of the collimating tube 52 also provides vacuum isolation of the pellet production chamber 33. The pellets 46 as they fall along path 48 into combustion chamber 47 are detected and irradiated 10 cm., for example, below the collimating tube 52 by a laser system similar to that of the above-referenced U.S. Pat. No. 3,723,703.

It has thus been shown that the present invention provides a method and apparatus for producing small diameter (25μ to 75μ) deuterium pellets for irradiation by a laser system producing plasma therefrom, without the use of liquid helium, which renders the method both safe and inexpensive (approximately $10^{-5}$ dollar per pellet).

While particular design details and embodiments have been illustrated and/or described, it is not intended to limit the invention to such as modifications will become apparent to those skilled in this art, and it is intended to cover all such modifications in the appended claims as come within the spirit and scope of the invention.

What we claim is:

1. A method for producing laser targets of deuterium having a diameter in the range of 25μ to 75μ comprising the steps of precooling a quantity of liquid deuterium, by cooling the liquid deuterium to a temperature in the range of 19° K to 22° K at a pressure in the range of 400 to 1200 Torr, forming a continuous thread of the thus cooled deuterium, by directing the thus cooled deuterium through a tapered orifice at a rate of about 50 micron-liters per second into a vacuum chamber maintained at less than $10^{-4}$ torr slicing the thus formed thread into desired length pellets, by use of a wire held at about 21° K collecting the thus sliced pellets, in a funnel bearing a roughened surface with a slope of about 20° and held at a temperature of about 77° K and collimating the collected pellets for passage thereof through the focal point of a laser system by passing the thus collected pellets through a capillary tube held at liquid nitrogen temperature and bearing a clean, smooth interior wall wherein the pressure within said tube continuously decreases from said funnel to said focal point of said system and is sufficiently low so as to prevent the pellets from becoming unduly warmed.

* * * * *